(12) United States Patent
Myers et al.

(10) Patent No.: US 8,122,725 B2
(45) Date of Patent: Feb. 28, 2012

(54) METHODS AND SYSTEMS FOR OPERATING GAS TURBINE ENGINES

(75) Inventors: Geoffrey David Myers, Simpsonville, SC (US); David August Snider, Simpsonville, SC (US); Eric Motter, Jacksonville, FL (US); Daniel R. Tegel, Simpsonville, SC (US); James Harper, Greenville, SC (US); Stephen R. Watts, Greer, SC (US); Joseph Citeno, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1417 days.

(21) Appl. No.: 11/933,898

(22) Filed: Nov. 1, 2007

(65) Prior Publication Data

US 2010/0043387 A1    Feb. 25, 2010

(51) Int. Cl.
 F02C 7/22 (2006.01)
 F02C 9/26 (2006.01)
 F02C 9/00 (2006.01)
 F02C 3/00 (2006.01)

(52) U.S. Cl. ......... 60/776; 60/39.37; 60/790; 60/39.281
(58) Field of Classification Search .............. 60/734, 60/739, 740, 39.37, 790, 243, 244, 39.281, 60/776, 39.17
 See application file for complete search history.

(56) References Cited

U.S. PATENT DOCUMENTS

| | | | |
|---|---|---|---|
| 2,629,225 A * | 2/1953 | Ammann | 60/248 |
| 4,157,012 A | 6/1979 | DuBell | |
| 4,292,801 A | 10/1981 | Wilkes et al. | |
| 4,964,270 A * | 10/1990 | Taylor et al. | 60/39.094 |
| 5,020,329 A | 6/1991 | Ekstedt et al. | |
| 5,069,029 A * | 12/1991 | Kuroda et al. | 60/776 |
| 5,148,667 A | 9/1992 | Morey | |
| 5,154,059 A * | 10/1992 | Keller | 60/737 |
| 5,319,931 A * | 6/1994 | Beebe et al. | 60/773 |
| 5,345,757 A | 9/1994 | MacLean et al. | |
| 5,365,732 A * | 11/1994 | Correa | 60/39.281 |
| 5,722,230 A * | 3/1998 | Cohen et al. | 60/39.37 |
| 5,865,024 A | 2/1999 | Kress et al. | |
| 6,367,239 B1 | 4/2002 | Brown et al. | |
| 6,393,823 B1 | 5/2002 | Badeer | |
| 6,397,602 B2 | 6/2002 | Vandervort et al. | |
| 6,405,524 B1 | 6/2002 | Mistry et al. | |
| 6,481,209 B1 | 11/2002 | Johnson et al. | |

(Continued)

FOREIGN PATENT DOCUMENTS

GB     2239056     * 10/1989

*Primary Examiner* — William H Rodriguez
*Assistant Examiner* — Gerald Sung
(74) *Attorney, Agent, or Firm* — Armstrong Teasdale LLP

(57) ABSTRACT

Methods and systems for delivering fuel in a gas turbine engine are provided. The system includes a plurality of can annular combustors that includes at least a first set of combustors of the plurality of can annular combustors and at least a second set of combustors of the plurality of can annular combustors wherein each set of combustors is supplied by a separately controllable respective fuel delivery system. The method includes supplying fuel at a first fuel schedule to the first set of combustors and supplying fuel at a second fuel schedule to the second set of combustors during a first mode of operation wherein the second fuel schedule is different than the first fuel schedule, and supplying fuel at the second fuel schedule to the first and second sets of combustors during a second mode of operation.

19 Claims, 5 Drawing Sheets

U.S. PATENT DOCUMENTS

| | | |
|---|---|---|
| 6,497,103 B2 | 12/2002 | Johnson et al. |
| 6,598,383 B1 | 7/2003 | Vandervort et al. |
| 6,655,152 B2 * | 12/2003 | Griffiths et al. ................ 60/773 |
| 6,722,135 B2 | 4/2004 | Davis, Jr. et al. |
| 6,736,338 B2 | 5/2004 | Johnson et al. |
| 6,810,655 B2 | 11/2004 | Davis, Jr. et al. |
| 6,968,693 B2 | 11/2005 | Colibaba-Evulet et al. |
| 6,986,254 B2 | 1/2006 | Stuttaford et al. |
| 7,080,515 B2 * | 7/2006 | Wasif et al. .................... 60/737 |
| 7,137,256 B1 | 11/2006 | Stuttaford et al. |
| 7,568,335 B2 * | 8/2009 | Althaus ........................ 60/39.17 |
| 2001/0047650 A1 * | 12/2001 | Muller et al. ................ 60/39.06 |
| 2004/0255594 A1 * | 12/2004 | Baino et al. .................... 60/773 |
| 2005/0097895 A1 * | 5/2005 | Kothnur et al. ................ 60/776 |
| 2008/0016875 A1 * | 1/2008 | Ryan et al. .................... 60/776 |

* cited by examiner

METHODS AND SYSTEMS FOR OPERATING GAS TURBINE ENGINES

BACKGROUND

This invention relates generally to gas turbine engines, and more specifically to methods and systems for operating gas turbine engines at significantly lower load conditions while having stable combustion and lower emissions.

Gas turbine engines typically include a compressor, one or more combustors each having a fuel injection system, and a turbine section. In an engine having a plurality of combustors, they are typically arranged in an annular array about the engine and most typically interconnected for the purposes of ignition. The compressor raises the pressure of inlet air, and then directs it to the combustors, where it is used to cool the combustion chamber walls as well to provide air for the combustion process. In the combustion chamber, compressed air is mixed with a fuel and the mixture is ignited by an ignition source to produce hot combustion gases.

While a full load condition is the most common operating point for land-based gas turbines used for generating electricity, often times electricity demands do not require the full load of the generator, and the operator desires to operate the engine at a lower load setting, such that only the load demanded is produced, thereby saving fuel costs. Combustion systems of the prior art have been known to become unstable at lower load settings while also producing unacceptable levels of carbon monoxide (CO) and oxides of nitrogen ($NO_X$) at these lower load settings, especially below 50% load. This is primarily due to the fact that most combustion systems are staged for most efficient operation at high load settings and therefore operate less efficiently at lower load settings. Furthermore, lower emissions can be achieved through premixing air and fuel together prior to combustion, instead of through diffusion, and therefore premixing generally facilitates combustion for lowest $NO_X$ emissions. However, even with various methods of fuel staging, known gas turbine engines are still limited in turndown capability.

The combination of potentially unstable combustion and higher emissions often times prevents engine operators from running engines at lower load settings, forcing the engines to either run at higher settings, thereby burning additional fuel, or shutting down, and thereby losing valuable revenue that could be generated from the part-load demand. A further problem with shutting down the engine is the additional cycles that are incurred by the engine hardware. A cycle is commonly defined as the engine passing through the normal operating envelope and thereby exposing the engine hardware to a complete cycle of pressures and temperatures that over time cause wear to the engine hardware. Engine manufacturers typically rate hardware life in terms of operating hours or equivalent operating cycles. Therefore, incurring additional cycles can reduce hardware life requiring premature repair or replacement at the expense of the engine operator.

SUMMARY

In one embodiment, a method of delivering fuel in a gas turbine engine includes supplying fuel at a first fuel schedule to a first set of combustors and supplying fuel at a second fuel schedule to a second set of combustors during a first mode of operation wherein the second fuel schedule is different than the first fuel schedule, and supplying fuel at the second fuel schedule to the first and second sets of combustors during a second mode of operation.

In yet another embodiment, a fuel delivery system for a gas turbine engine includes a plurality of combustors grouped into a plurality of sets of combustors, a fuel manifold associated with each set of the plurality of sets of combustors, each said fuel manifold coupled to a respective one of the sets of combustors, each said fuel manifold configured to deliver fuel at a predetermined fuel schedule to the respective one of the sets of combustors, and a control system operatively coupled to each of said fuel manifolds, said control system configured to control fuel flowing through each of said fuel manifolds such that combustors associated with a first fuel manifold are maintained with at least one of a diffusion flame and a piloted premixed partial diffusion flame and combustors associated with a second fuel manifold are maintained with a premix flame during a first mode of operation.

In another embodiment, a gas turbine engine assembly includes a first set of combustors, a second set of combustors, and a fuel delivery system including a fuel manifold coupled to an associated set of combustors, wherein a first fuel manifold is coupled to the first set of combustors and a second fuel manifold is coupled to the second set of combustors. The fuel delivery system is configured to control fuel flowing through each of the fuel manifolds such that combustors associated with the first fuel manifold are maintained with at least one of a diffusion flame and a piloted premixed partial diffusion flame and combustors associated with the second fuel manifold are maintained with a premix flame during a first mode of operation.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of delivering fuel in a gas turbine engine. However, it is contemplated that this disclosure has general application to delivering fuel to devices having other burners than combustors such as but not limited to furnaces, boilers, kilns, and incinerators.

Figure 1:
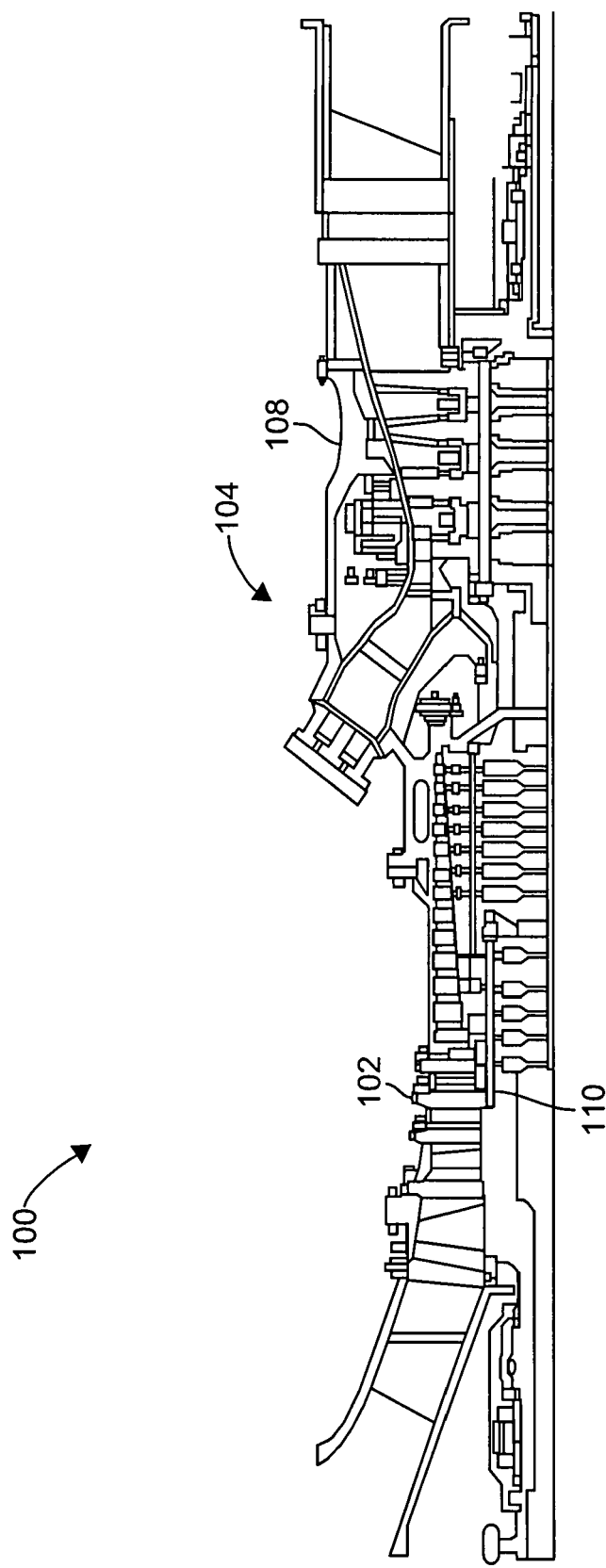
FIG. 1 is a schematic illustration of an exemplary gas turbine engine in accordance with an exemplary embodiment of the present invention.

FIG. 1 is a schematic illustration of an exemplary gas turbine engine 100. Engine 100 includes a compressor 102 and a plurality of can annular combustors 104. Engine 100 also includes a turbine 108 and a common compressor/turbine shaft 110 (sometimes referred to as rotor 110).

In operation, air flows through compressor 102 and compressed air is supplied to combustors 104. Fuel is channeled to a combustion region, within combustors 104 wherein the fuel is mixed with the air and ignited. Combustion gases are generated and channeled to turbine 108 wherein gas stream thermal energy is converted to mechanical rotational energy. Turbine 108 is rotatably coupled to, and drives, shaft 110.

Figure 2:
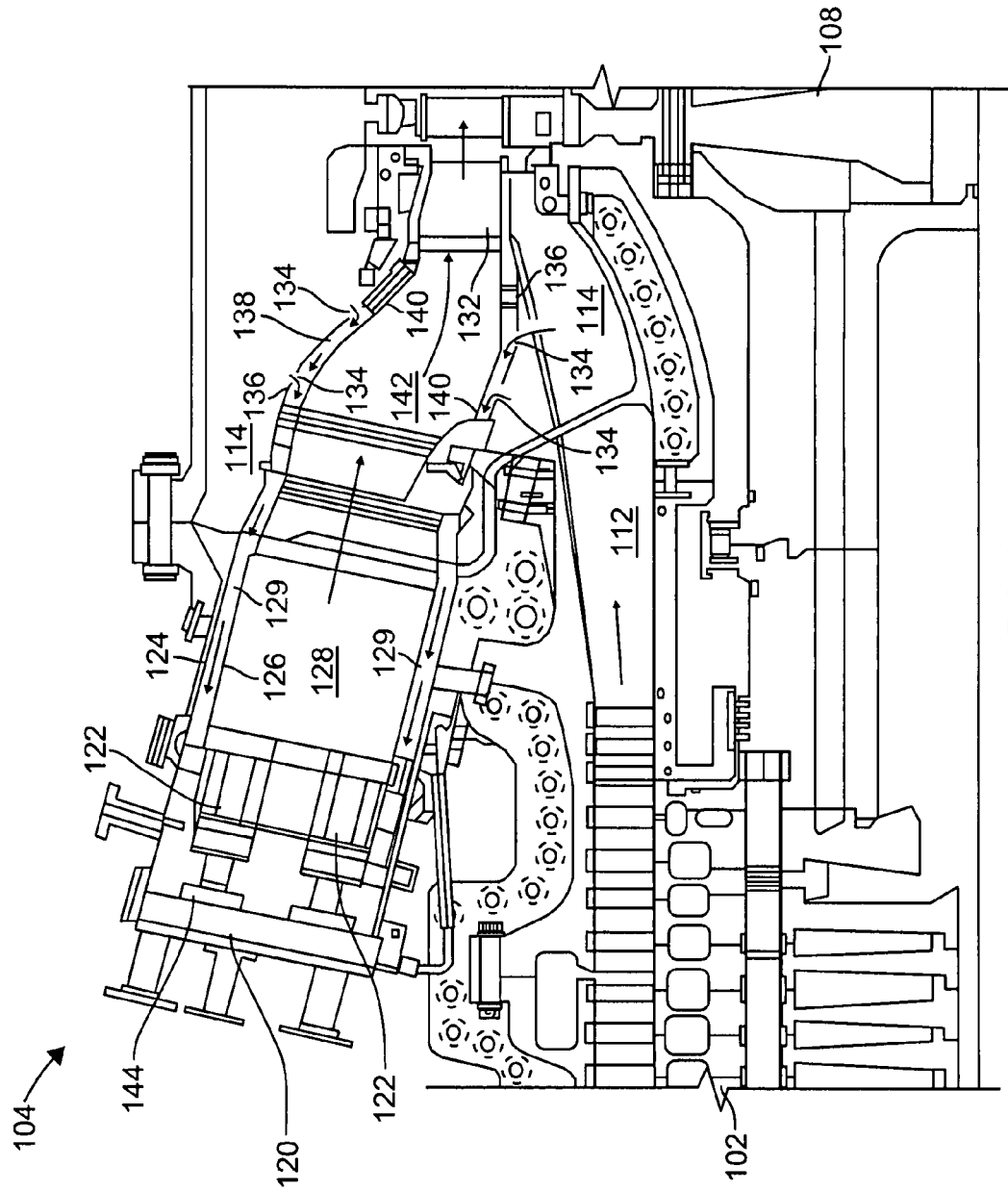
FIG. 2 is a cross-sectional schematic view of a combustor that may be used with the gas turbine engine shown in FIG. 1.

FIG. 2 is a cross-sectional schematic view of a combustor 104. Combustor assembly 104 is coupled in flow communication with turbine assembly 108 and with compressor assembly 102. Compressor assembly 102 includes a diffuser 112 and a compressor discharge plenum 114 that are coupled in flow communication to each other.

In the exemplary embodiment, combustor assembly 104 includes an end cover 120 that provides structural support to a plurality of fuel nozzles 122. End cover 120 is coupled to combustor casing 124 with retention hardware (not shown in FIG. 2). A combustor liner 126 is positioned within and is coupled to casing 124 such that liner 126 defines a combustion chamber 128. An annular combustion chamber cooling passage 129 extends between combustor casing 124 and combustor liner 126.

A transition portion or piece 130 is coupled to combustor casing 124 to facilitate channeling combustion gases generated in chamber 128 towards turbine nozzle 132. In the exemplary embodiment, transition piece 130 includes a plurality of openings 134 formed in an outer wall 136. Piece 130 also includes an annular passage 138 defined between an inner wall 140 and outer wall 136. Inner wall 140 defines a guide cavity 142.

In operation, turbine assembly 108 drives compressor assembly 102 via shaft 110 (shown in FIG. 1). As compressor assembly 102 rotates, compressed air is discharged into diffuser 112 as the associated arrows illustrate. In the exemplary embodiment, the majority of air discharged from compressor assembly 102 is channeled through compressor discharge plenum 114 towards combustor assembly 104, and a smaller portion of compressed air may be channeled for use in cooling engine 100 components. More specifically, the pressurized compressed air within plenum 114 is channeled into transition piece 130 via outer wall openings 134 and into passage 138. Air is then channeled from transition piece annular passage 138 into combustion chamber cooling passage 129. Air is discharged from passage 129 and is channeled into fuel nozzles 122.

Fuel and air are mixed and ignited within combustion chamber 128. Casing 124 facilitates isolating combustion chamber 128 and its associated combustion processes from the outside environment, for example, surrounding turbine components. Combustion gases generated are channeled from chamber 128 through transition piece guide cavity 142 towards turbine nozzle 132. In the exemplary embodiment, fuel nozzle assembly 122 is coupled to end cover 120 via a fuel nozzle flange 144.

Figure 3:
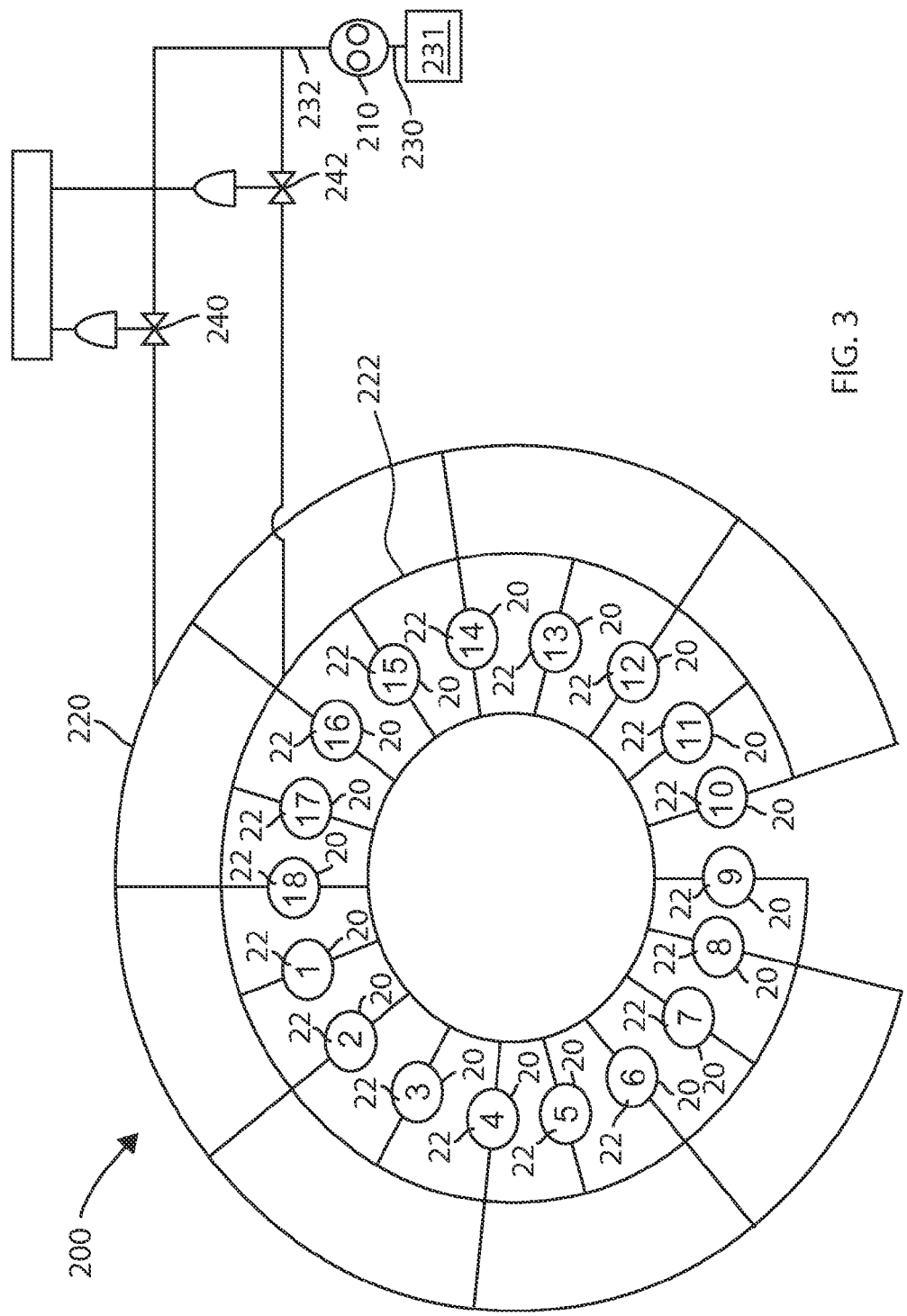
FIG. 3 is a simplified block diagram of an exemplary fuel delivery system that may be utilized with the gas turbine engine shown in FIG. 1.
Figure 4:
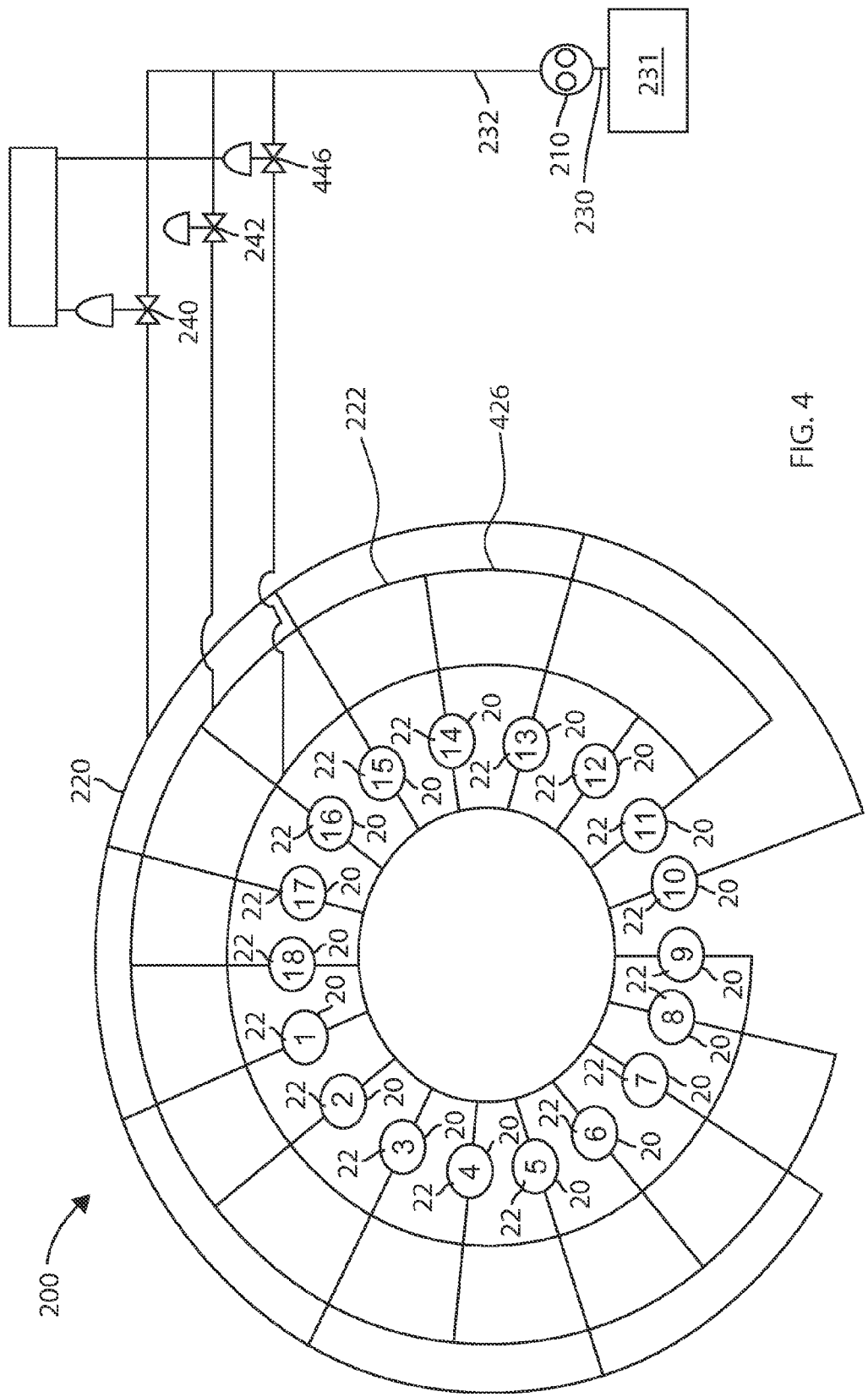
FIG. 4 is a simplified block diagram of another exemplary fuel delivery system that may be utilized with the gas turbine engine shown in FIG. 1.

FIG. 3 is a simplified block diagram of an exemplary fuel delivery system 200 that may be utilized with the gas turbine engine shown in FIGS. 1 and 2. FIG. 4 is a simplified block diagram of another exemplary fuel delivery system 200 that may be utilized with the gas turbine engine shown in FIGS. 1 and 2. In the exemplary embodiment shown in FIG. 3, gas turbine engine 10 includes eighteen combustor sections 20 that, in the embodiment, form an annular ring. In other embodiments, other numbers of combustor sections 20, for example fourteen are used. In the exemplary embodiment, each combustor section 20 includes at least one fuel nozzle assembly 22.

The fuel nozzle assemblies 22 are located circumferentially about the periphery of engine 10 proximate to combustor section 20. Specifically, combustor sections 20 form an annular ring around an inner periphery of the gas turbine engine, and as such, the fuel nozzle assemblies, and the fuel manifolds also form an annular ring circumferentially around gas turbine engine 10.

Although, the exemplary embodiment illustrate gas turbine engine 10 including eighteen combustor sections 20 and eighteen fuel nozzle assemblies 22, it should be realized that fuel system 200 may be utilized with a gas turbine engine including n combustor sections and n*x fuel nozzles 22, wherein $n \geq 2$ and $x \geq 1$. For example, gas turbine engine 10 may include n=18 combustors, moreover, if x=1, engine 10 includes 18 fuel nozzles, i.e. one fuel nozzle per combustor. Optionally, if x=2, engine 10 includes 36 fuel nozzle, i.e. two fuel nozzles per combustor, etc. Additionally, nozzles within the combustion chamber can be further sub-grouped by an internal or external manifold at the combustion chamber level, and with an external manifold at the array level such that a given nozzle sub-group has a common supply at the array or array subset level.

Fuel delivery system 200 includes a fuel pump 210 that is configured to receive fuel from a fuel supply (not shown). Fuel pump 210 is utilized to deliver fuel to at least a first fuel manifold 220 and a second fuel manifold 222. The first and second fuel manifolds 220 and 222 are both metered and sized to achieve a pressure ratio within fuel delivery system 200 appropriate for the quantity of fuel being delivered to the gas turbine engine. The first and second manifolds 220 and 222 themselves can be an aggregate of multiple subset manifolds, where both first and second arrangements include manifolds to independently supply and control nozzle sub-groups at the combustor chamber level. As shown in FIG. 4, an alternative embodiment of fuel delivery system 200 includes a third fuel manifold 426 that is configured to supply fuel to a third set of combustor sections 20.

Specifically fuel delivery system 200 includes a fuel suction line 230 which extends from the fuel source 231 to an inlet of fuel pump 210, and a discharge line 232 that extends from the discharge side of fuel pump 210 to each of the first and second fuel manifolds 220 and 222. In the exemplary embodiment, a first staging valve 240 is disposed in discharge line 232 between pump 210 and first manifold 220, and a second staging valve 242 is disposed in discharge line 232 between pump 210 and second manifold d 222. In the embodiment shown in FIG. 4, a third staging valve 446 is disposed in discharge line 232 between pump 210 and third manifold 426.

Although, the exemplary embodiment shown in FIG. 3 illustrates fuel delivery system 200 as including two manifolds 220 and 222, it should be realized that fuel delivery system 200 may have three or more fuel manifolds. For example, FIG. 3 illustrates that first manifold 220 delivers fuel to nine combustor sections 20 and second manifold 222 also delivers fuel to nine combustor sections 20. However, fuel delivery system may include three manifolds wherein each manifold delivers fuel to six combustor sections as shown in FIG. 4. In the exemplary embodiment, the combustor array may include multiple combustor can subsets, wherein each subset may include multiple nozzle sub-groupings. Additionally, the spacing and number of cans supplied by each manifold may be varied depending on aeromechanic or other system considerations.

Figure 5:
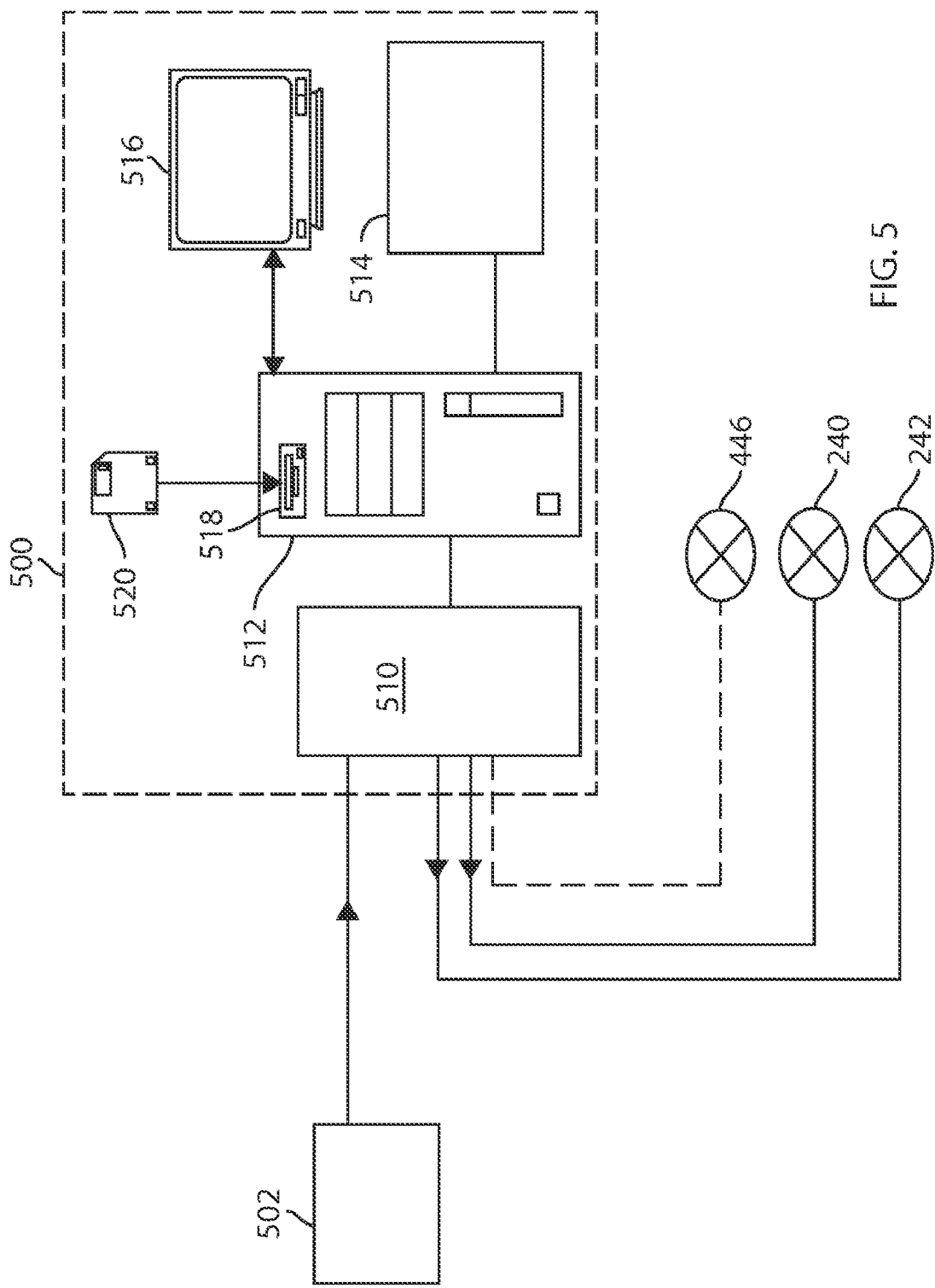
FIG. 5 is an exemplary control system that may be utilized to operate and/or control the exemplary fuel delivery system shown in FIG. 3.

FIG. 5 is an exemplary control system 500 that may be utilized to operate and/or control the exemplary fuel delivery system 200 shown in FIG. 3. Control system 500 may comprise an electronic control unit (ECU) or an engine monitoring unit (EMU) such as a Full Authority Digital Engine Control (FADEC), or a Modernized Digital Engine Control (MDEC). In an alternative embodiment, engine control system 300 includes any engine controller that is configured to send and/or receive signals from gas turbine engine 10 to facilitate control and/or monitoring of fuel delivery system 200. Specifically, as used herein, an ECU can be any electronic device that resides on or around an engine and includes a processor and at least one of software, firmware, and/or hardware that is programmed to control and/or monitor fuel delivery system 200.

A plurality of engine data sensors 502 are provided to sense selected data parameters related to the operation of gas turbine engine 10. Such data parameters can include, but are not limited to, ambient air temperature, and engine parameters such as exhaust gas temperature, oil temperature, engine fuel flow, gas turbine engine speed, compressor discharge pressure, turbine exhaust pressure, and/or a plurality of other signals received from gas turbine engine 10.

Control system 500 includes a control interface section 510 that samples data received from the above described engine sensors and outputs a control signal to each of the first and second staging valves 240, 242 during selected engine operating conditions. In embodiments where more than two staging valves are used such as in FIG. 4, interface section 510 also controls the respective valves, for example, valve 446.

More specifically, control interface section 510 converts the data received from the engine sensors to digital signals for subsequent processing. A computer 512 receives the sampled and digitized sensor data from control interface section 510 and performs high-speed data analysis. Computer 512 may also receive commands from an operator via a keyboard 514. An associated monitor 516 such as, but not limited to, a liquid crystal display (LCD) and/or a cathode ray tube, allows the operator to observe data received from computer 512. The operator supplied commands and parameters are used by computer 512 to provide control signals and information to control interface section 510.

In one embodiment, computer 512 includes a device 518, for example, a floppy disk drive, CD-ROM drive, DVD drive, magnetic optical disk (MOD) device, and/or any other digital device including a network connecting device such as an Ethernet device for reading instructions and/or data from a computer-readable medium 520, such as a floppy disk, a CD-ROM, a DVD or an other digital source such as a network or the Internet, as well as yet to be developed digital means. In another embodiment, computer 512 executes instructions stored in firmware (not shown). Computer 512 is programmed to perform the functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

In operation, fuel delivery system 200 is capable of delivering fuel to gas turbine engine 10 during all operating conditions. Specifically, control system 500 is configured to open and modulate valves 240 and 242 during a first mode of operation. In an alternative embodiment, control system 500 is configured to staging valves 240 and 242 during a first mode of operation and modulation and control of the combustors associated with staging valves 240 and 242 is controlled downstream, for example, at a control manifold (not shown) at each combustor or set of combustors associated with staging valves 240 and 242. For example, during an initial engine startup mode or low power operation mode, computer 512 may be programmed to open first staging valve 240 and modulate second staging valve 242 such that a set of combustors associated with first staging valve 240 operates in a first flame mode, for example, premix mode and a set of combustors associated with second staging valve 242 are operated in a second flame mode, for example, a diffusion flame and/or a piloted premixed partial diffusion flame. In the first mode of operation, fuel is supplied, via pump 210, through first staging valve 240, through the first manifold 220 and into the plurality of combustor sections 20. As shown in FIGS. 3 and 4, in this mode of operation, fuel for premix operation is supplied to only a portion of the combustor sections 20 and fuel for diffusion or piloted premixed partial diffusion operation is supplied to the remaining combustor sections. That is, the combustor sections operating in premix mode are interposed with the combustor sections operating in a diffusion flame or a piloted premixed partial diffusion flame mode. More specifically, each combustor section receiving fuel for premix operation is disposed adjacent to a combustor section that is receiving fuel for diffusion flame or piloted premixed partial diffusion flame operation in the first mode of operation. The given spacing and arrangement of the array subsets is determined by the power level desired and the aeromechanic considerations of the turbine section. Operation in a mixed flame mode for example, a premix mode and a diffusion flame or a piloted premixed partial diffusion flame simultaneously permits engine 10 to operate at a relatively lower power output level than would be possible using all combustors in a premix mode of operation and at a lower emissions level than would be possible with all combustors operating in a diffusion mode. Additionally, even though an individual combustor operating in the diffusion flame or a piloted premixed partial diffusion flame mode may emit relatively higher $NO_x$ than a combustor operating in the premix mode, the mixed exhaust from all the combustors in the exhaust stack is held to allowable limits while permitting operation at lower load and fuel use levels.

In a second mode of operation, control system 500 is configured to open or modulate second staging valve 242 such that fuel is supplied, via pump 210, through second staging valve 242, through the second manifold 222 and into the remaining combustion sections. In an alternative embodiment, control system 500 is configured to open second staging valve 242 during the second mode of operation and modulation and control of the combustors associated with second staging valve 242 is controlled downstream, for example, at a control manifold (not shown) at each combustor or set of combustors associated with second staging valve 242. For example, during a second mode of operation, fuel delivery system 200 permits additional fuel to flow to remaining combustor sections 20 to transition to premix flame operation to increase the power output of the gas turbine engine 10. Accordingly, in the second mode of operation, both the first and second manifolds are supplying fuel to all of the combustor sections and all combustors are operating in a premix flame mode. In this mode of operation, fuel delivery system 200 establishes two independently controlled, parallel fuel supplies to the combustion system. More specifically, during base load, or high levels of part load, both systems are identically controlled base on the existing control curves or fuel schedules.

In a third mode of operation, referred to herein as a power "turn down" mode, when a reduced power output from gas turbine engine is desired, the appropriate fuel circuits are transitioned to a diffusion flame or a piloted premixed partial diffusion flame fuel flow to a selected set of combustor cans. In this embodiment, either first or second staging valves 240 or 242 are modulated such that premix flame operation is used in only one-half of the combustor sections 20.

Described herein is an exemplary fuel delivery system that is configured to select a diffusion flame or a piloted premixed partial diffusion flame mode of operation for a selectable set of combustors and modulate the fuel flow to reduce emissions during selected operating conditions. The exemplary fuel delivery system is also configured to optimize power turndown operations of the gas turbine engine, allowing the end user to have a more profitable operation, while also reducing emissions. Additionally, the fuel delivery system improves the robustness of the gas turbine in peaking or load following applications, for example, to run at minimum turndown conditions rather than incurring a damaging shutdown/startup cycle.

The system provides flame stability and low emissions benefits throughout the full operating conditions of the gas turbine engine for a combustion system in a can orientation, including a low part-load condition. The system can be efficiently operated at lower load conditions, thereby eliminating the wasted fuel when high load operation is not demanded or incurring the additional cycles on the engine hardware when shutting down. The exemplary fuel delivery system also enables significantly lower levels of power turn down than are currently possible.

For example, during base load, or high levels of part load, both the first manifold and the second manifolds are identically controlled based on the existing control curves and/or fuel schedules. When minimum power turndown is commanded, the appropriate fuel circuits are transitioned to a diffusion flame mode or a partial diffusion flame mode, for example, a piloted premix mode to a selected set of combustion cans. As such, the reduction in power does not require a reduction in the combustion temperatures in one set of combustors, however, the expected increased emissions from each combustor operating in the diffusion flame or piloted mode combined with the emissions from the combustors still operating in the premix mode permits total emissions to remain in compliance. Therefore it will not have a negative impact on the emissions output of the system. Moreover, significantly lower levels of turndown will be manageable.

While embodiments of the disclosure have been described in terms of various specific embodiments, it will be recognized that the embodiments of the disclosure can be practiced with modification within the spirit and scope of the claims.

What is claimed is:

1. A method for delivering fuel in a gas turbine engine including a plurality of can annular combustors that includes at least a first set of combustors of the plurality of can annular combustors and at least a second set of combustors of the plurality of can annular combustors, said first and second set of combustors of the plurality of can combustors oriented along a common axial location wherein each set of combustors is supplied by a separately controllable respective fuel delivery system, said method comprising: supplying fuel at a first fuel schedule to the first set of combustors and supplying fuel at a second fuel schedule to the second set of combustors during a first mode of operation wherein the second fuel schedule is different than the first fuel schedule; modulating the fuel supplied at the first fuel schedule to the first set of combustors such that at least one of a diffusion flame and a piloted premixed partial diffusion flame is maintained in the first set of combustors while a premix flame is maintained in the second set of combustors during the first mode of operation wherein fuel for the premix flame is only supplied to the second set of combustors and fuel for diffusion flame or piloted premixed partial diffusion flame is supplied only to the first set of combustors during the first mode of operation; and supplying fuel at the second fuel schedule to the first and second sets of combustors during a second mode of operation.

2. A method in accordance with claim 1 wherein supplying fuel comprises modulating the fuel supplied at the second fuel schedule to the first and second sets of combustors such that a premix flame is maintained in the first and second sets of combustors during the second mode of operation.

3. A method in accordance with claim 1 further comprises:
supplying fuel at the second fuel schedule to the first and second sets of combustors during a second mode of operation;
changing the mode of operation from the second mode of operation capable of achieving full power output of the gas turbine engine to the first mode of operation;
supplying fuel at the first fuel schedule to the first set of combustors such that at least one of a diffusion flame and a piloted premixed partial diffusion flame is maintained in the first set of combustors and a premix flame is maintained in the second set of combustors during the first mode of operation.

4. A method in accordance with claim 1 wherein the gas turbine engine includes a plurality of sets of combustors of the plurality of can annular combustors wherein each of the plurality of sets of combustors is supplied by a separately controllable respective fuel delivery system, said method comprising:
supplying fuel at the first fuel schedule to one or more of the plurality of sets of combustors and supplying fuel at the second fuel schedule to the remaining sets of the plurality of combustors during a first mode of operation;
and supplying fuel at the second fuel schedule to the plurality of sets of combustors during a second mode of operation.

5. A method in accordance with claim 1 wherein the gas turbine engine includes a plurality of sets of combustors of the plurality of can annular combustors wherein each of the plurality of sets of combustors is supplied by a separately controllable respective fuel delivery system, said method comprising:
supplying fuel at the first fuel schedule to one or more of the plurality of sets of combustors, supplying fuel at the second fuel schedule to one or more of the plurality of sets of combustors, and supplying fuel at a third fuel schedule to the remaining sets of the plurality of combustors during a third mode of operation wherein the third fuel schedule is different than the first and second fuel schedules; and
supplying fuel at the second fuel schedule to the plurality of sets of combustors during a second mode of operation.

6. A method in accordance with claim 1 wherein supplying fuel at a first fuel schedule to the first set of combustors comprises supplying fuel at a first fuel schedule to the first set of combustors such that the exit temperature of each combustor is facilitated being reduced.

7. A method in accordance with claim 1 wherein the plurality of can annular combustors are positioned annularly about an inlet to the turbine.

8. A fuel delivery system for a gas turbine engine, said fuel delivery system comprising: a plurality of combustors grouped into a plurality of sets of combustors, said plurality of sets of combustors comprising at least a first set of combustors and at least a second set of combustors, said first and second set of combustors of the plurality of sets of combustors oriented along a common axial location; a fuel manifold associated with each set of the plurality of sets of combustors, each said fuel manifold coupled to a respective one of the sets of combustors, each said fuel manifold configured to deliver fuel at a predetermined fuel schedule to the respective one of the sets of combustors; and a computer control system operatively coupled to each of said fuel manifolds, said control system configured to control fuel flowing through each of said fuel manifolds such that combustors associated with a first fuel manifold are maintained with at least one of a diffusion flame and a piloted premixed partial diffusion flame and combustors associated with a second fuel manifold are maintained with a premix flame during a first mode of operation wherein fuel for the premix flame is only supplied through the second fuel manifold and fuel for diffusion flame or piloted premixed partial diffusion flame is supplied only through the first fuel manifold during the first mode of operation.

9. A system in accordance with claim 8 wherein said control system is further configured to control fuel flowing through all of said fuel manifolds such that said plurality of combustors are maintained with a premix flame during a second mode of operation.

10. A system in accordance with claim 8 wherein said control system is further configured to modulate a first fuel manifold using a first fuel schedule and to modulate a second fuel manifold using a second fuel schedule during the first mode of operation.

11. A system in accordance with claim 8 wherein said control system is further configured to modulate the fuel manifolds associated with each set of the plurality of sets of combustors using the second fuel schedule during second mode of operation.

12. A system in accordance with claim 8 wherein said control system is further configured to operate all combustors using a premix flame during relatively high gas turbine engine load conditions.

13. A system in accordance with claim 8 wherein said control system is further configured to operate at least one set of the combustors using at least one of a diffusion flame and a piloted premixed partial diffusion flame during relatively low gas turbine engine load conditions.

14. A system in accordance with claim 8 wherein the plurality of combustors is spaced annularly about a longitudinal axis of the gas turbine engine.

15. A system in accordance with claim 8 wherein combustors from one of the plurality of sets of combustors are interposed between combustors from another of the plurality of sets of combustors.

16. A gas turbine engine assembly comprising: a first set of combustors; a second set of combustors that are oriented along a common axial location with said first set of combustors; and a fuel delivery system comprising: a fuel manifold coupled to an associated set of combustors, wherein a first fuel manifold is coupled to said first set of combustors and a second fuel manifold is coupled to said second set of combustors; and a computer controls system operatively coupled to each of said fuel manifolds, said control system configured to control fuel flowing through each of said fuel manifolds such that combustors associated with the first fuel manifold are maintained with at least one of a diffusion flame and a piloted premixed partial diffusion flame and combustors associated with the second fuel manifold are maintained with a premix flame during a first mode of operation, wherein fuel for the premix flame is only supplied through the second fuel manifold and fuel for diffusion flame or piloted premixed partial diffusion flame is supplied only though the first fuel manifold during the first mode of operation.

17. A gas turbine engine assembly in accordance with claim 16 wherein said fuel delivery system is configured to control fuel flowing through each of said fuel manifolds such that combustors associated with the first fuel manifold and combustors associated with the second fuel manifold are maintained with a premix flame during a second mode of operation.

18. A gas turbine engine assembly in accordance with claim 16 wherein said first set of combustors is interposed between said second set of combustors.

19. A gas turbine engine assembly in accordance with claim 16 further comprising a third set of combustors, said fuel delivery system comprising a third fuel manifold coupled to said set of combustors and configured to deliver fuel to said set of combustors during at least one of a first and a second mode of operation, said third set of combustors is interposed between said first and second sets of combustors.

* * * * *